Oct. 17, 1933.    C. P. HAFF    1,930,749
COLORING MATERIAL APPARATUS
Filed April 10, 1930    3 Sheets-Sheet 1

INVENTOR
Charles P. Haff
BY
Edwards, Gower & Pool
ATTORNEYS

Oct. 17, 1933.                C. P. HAFF                1,930,749
                       COLORING MATERIAL APPARATUS
                         Filed April 10, 1930        3 Sheets-Sheet 2
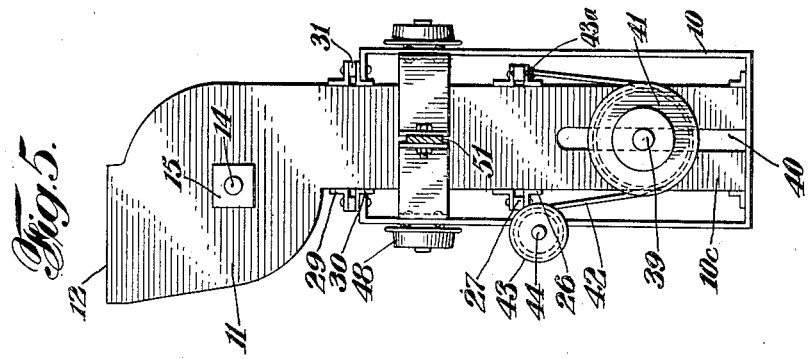
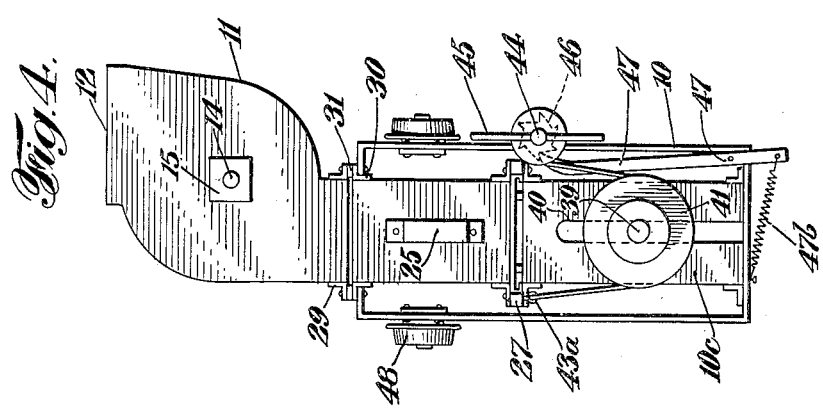
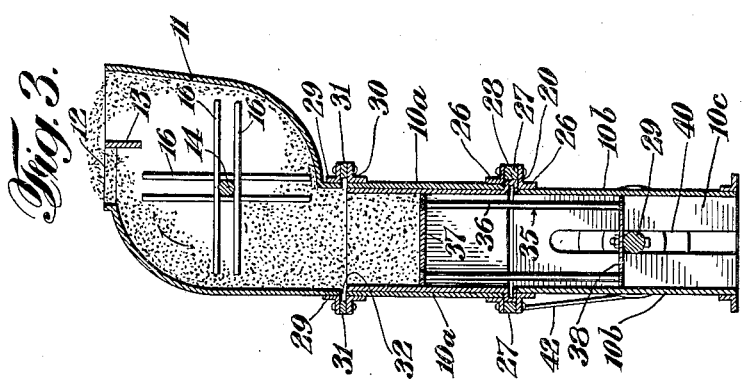
INVENTOR
Charles P. Haff
BY
Edwards, Bower & Pool
ATTORNEYS Oct. 17, 1933.    C. P. HAFF    1,930,749
COLORING MATERIAL APPARATUS
Filed April 10, 1930    3 Sheets-Sheet 3
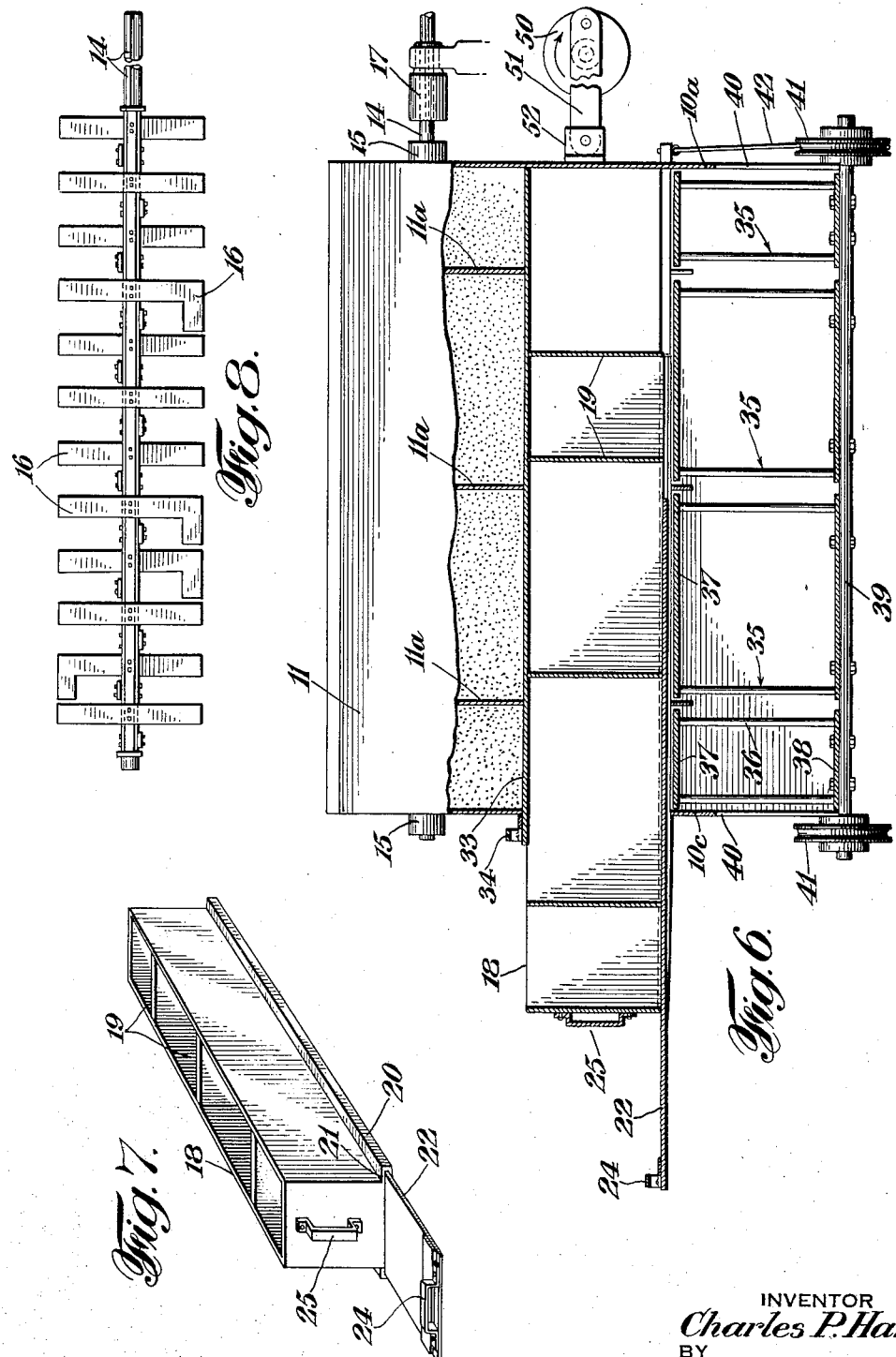
INVENTOR
Charles P. Haff
BY
Edwards, Bower & Pool
ATTORNEYS Patented Oct. 17, 1933

1,930,749

UNITED STATES PATENT OFFICE 1,930,749

COLORING MATERIAL APPARATUS

Charles P. Haff, Ambler, Pa., assignor to Ambler Asbestos Shingle & Sheathing Company, a corporation of Pennsylvania Application April 10, 1930. Serial No. 443,049

15 Claims. (Cl. 91—44)

The present invention relates to means and mechanism for supplying and distributing coloring materials; and has for its general object the provision of new and improved apparatus for supplying and distributing or applying coloring materials in dry or powdered form to desired surfaces.

To the above and other ends which will subsequently appear, the invention consists in the features of construction, combinations of devices and arrangements of parts hereinafter described and particularly pointed out in the appended claims.

In carrying out the invention in its preferred form, there is provided a unit or apparatus comprising three sections or parts, namely a hopper, a charging box and a plunger or piston element. The charging box is intermediate the hopper and piston element and is removable from the unit to be replenished with coloring materials. Removable slides or separators are provided at the top and bottom of the box so that it may be cut off or connected with the hopper and the piston chamber, and so connected the piston elements may be raised to force the coloring material from the charging box into the hopper, whence it is expelled by a rotary impelling device against a receiving surface.

The apparatus is particularly adapted for producing variegated color effects, the charging box being preferably divided into compartments for different coloring materials and the impelling device operating to variably expel these materials. To add to the variegated effect, the unit as a whole may be mounted so that it may be vibrated during the discharge of the coloring materials.

The invention will be described in detail in connection with the accompanying drawings illustrating its preferred form, and wherein:

Fig. 3 is a vertical transverse sectional view thereof.

Fig. 4 is an end elevation of the apparatus from the left hand side.

Fig. 5 is a corresponding end elevation as seen from the right hand end of the apparatus.

Fig. 6 is a longitudinal sectional view showing the parts of the apparatus and with the charging box partly removed.

Fig. 7 is a perspective of the charging box or container with the end slide partly displaced, and Fig. 8 is a front elevation of the impelling device shown detached.

The present form of invention was particularly designed for use in the system or process of producing an article to be colored, such as asbestos material shingles, as set forth in the prior application of John W. Ledeboer, Serial No. 424,919, filed Jan. 31, 1930; but it is of course to be understood that the invention is not limited to use with any particular system or process.

Figure 1:
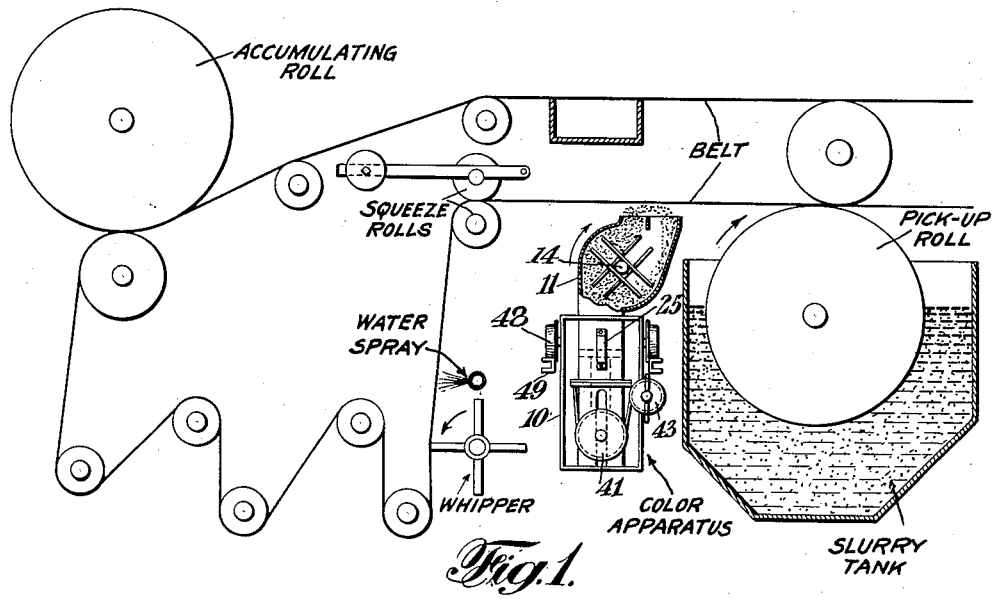
Fig. 1 is a diagrammatic view illustrating the coloring apparatus in association with a process for producing an article to be colored.

In the system aforesaid there is provided, as shown in Fig. 1, one or more slurry tanks associated with pick-up rolls for transferring the wet slurry in film form to a belt, whence it is transferred layer by layer to an accumulating roll, the belt, which is endless, thence returning over a system of idlers to the pick-up rolls to repeat the process. Between the accumulating roll and the first pick-up roll the belt is preferably cleaned and moistened as by a whipper, a water spray, and squeeze rollers whereby it is conditioned for receiving the slurry film. Between these conditioning devices and the first pick-up roll, the coloring apparatus or unit is arranged as shown in Fig. 1 so as to cooperate with the underside of the wet receiving surface or belt just prior to the first pick-up of the slurry, the result being that the coloring material clinging to the wet belt surface is overlaid by the slurry film so that when the film is applied to the accumulating roll the colored face will be outermost. As is well understood, the accumulating roll may receive a considerable number of superposed films of slurry material to produce an article of the desired thickness; and of course the coloring apparatus is not brought into operation until the formation of the last film or layer has begun.

The coloring apparatus or unit may comprise a metal frame or skeleton, rectangular in outline, indicated generally by the reference character 10. The discharging element is in the form of a hopper or trough-like member 11 suitably secured at the top of the frame work and provided with a mouth portion 12 which opens upwardly. As will be understood from Fig. 3, the mouth portion is divided by the longitudinally extending cross bar or baffle 13, the left hand side of the mouth, as viewed in said Fig. 3, providing for the expulsion of the coloring material from the hopper while the interposed baffle plate 13 maintains the right hand side free or clear so that excess material may be dropped downward from the belt into the hopper to be again expelled.

Figure 2:
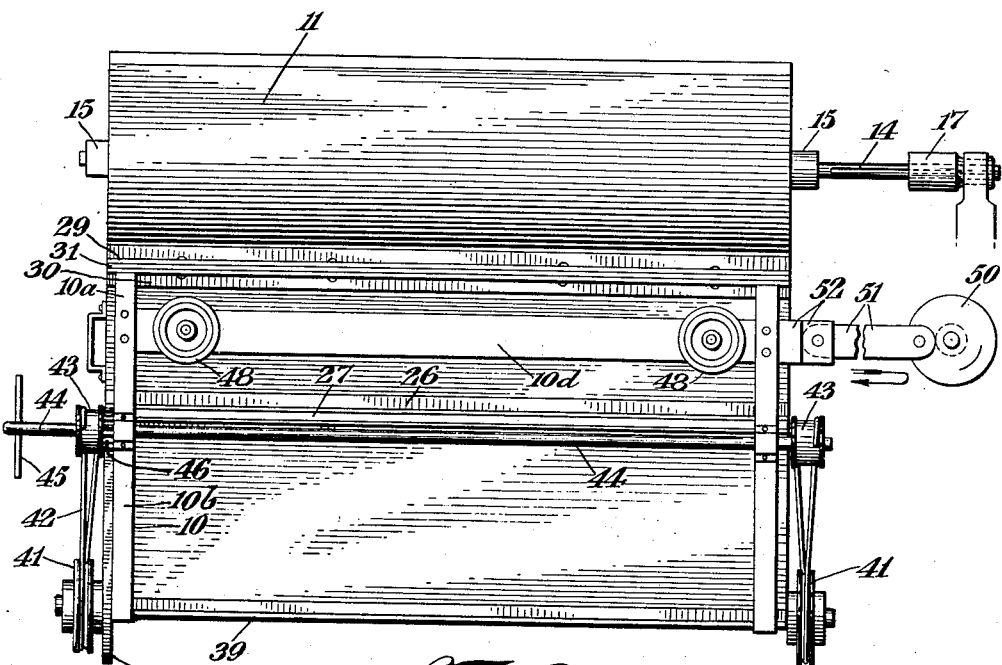
Fig. 2 is an elevation of the unit or apparatus.

The hopper contains an impelling device which, as shown, comprises a shaft 14 which extends longitudinally of the hopper and bears in members 15 secured to the end plates thereof. Fixed at spaced intervals along the shaft are a system of arms or paddles 16 which, as shown in Fig. 8, are preferably of different form so that they may act variably on the coloring material. The right hand end portion of the shaft 14 projects outside of the hopper, as shown in Figs. 2 and 6, and may be provided with a pulley 17 connected to a suitable source of power for rotating the impelling device and from which the impeller is disconnectible at will.

The charging element or color reservoir is in the form of a box-like member shown detached in Fig. 7 and designated as a whole by the numeral 18. The box or container is rectangular in shape, open at the top and preferably provided with a number of transverse partitions or plates 19, thus dividing the box into a series of compartments or receptacles which may vary in size as shown. At its bottom the box is provided with outwardly extending flanges 20 formed with longitudinal grooves 21 for the reception of a plate or slide 22 extending the full length of the box and entirely closing its bottom when in position.

It will be noted that when the slide is withdrawn the bottom of the box is opened. To conveniently effect withdrawal and replacement of the slide, a strap 24 may be provided at the left hand end and to effect removal of the box it may be similarly provided at its left hand end with a strap 25. For facilitating its placement in and removal from the apparatus, the box is received between bars or guides 10a of the frame 10, the construction being such that it may be conveniently slid into and out of the apparatus from the left hand side between the guide bars. The guide bars are connected with corresponding lower guide bars 10b, as clearly shown in Fig. 3, by angle plates 26 which are separated by spacers 27 providing grooves or guide-ways 28 for the flanges 20 of the charging box.

Similarly, the upper ends of the bars 10a are connected with the lower portion of the hopper 11 by angle plates 29 and 30 and spacers 31, thereby providing guide ways 32 between the open top of the charging box and the open bottom of the hopper. In the guide ways 32 is received a separator or plate-like slide 33 which provides a removable bottom for the hopper or which may be considered as a separating element between the hopper and the charging box. The slide 33, as shown in Fig. 6, is preferably provided with a strap 34 for convenient manipulation and may be readily slid inward and outward from the left hand side of the apparatus.

The lower frame bars 10b have secured to their outer faces plates 10c which, with the slide 22, constitute an open-sided chamber or housing for a set of pistons or plunger-like elements 35, each constituted by uprights 36 and top plates 37, the uprights at their lower ends being secured to base plates 38, which in turn are bolted or otherwise secured to a cross bar or shaft 39 as most clearly shown in Fig. 6. The end portions of the shaft 39 project outward through elongated slots indicated at 40 in the plates 10c. The plunger element or forcing means, it will be seen, is constituted by the bar or shaft 39 and the set of plunger devices 36, 37 secured thereto. It will be understood that a plunger device is provided for each of the compartments of the charging box and also that the hopper may be divided into corresponding compartments by cross partitions 11a.

The forcing means constituted by the system of pistons or plungers may be elevated for forcing the material from the charging box into the hopper and held in various adjusted positions. For this purpose the outwardly projecting ends of the bar or shaft 39 may be provided with grooved pulleys 41 connected by straps or ropes 42 with pulleys 43 secured to the outwardly projecting end portions of a shaft 44 which is mounted to rotate on the frame 10 (Figs. 2, 4 and 5). One end of each rope 42 is secured to the associate pulley 43 and the other end is secured to a fixed anchorage 43a, the straps between their ends passing around and under the associate guide pulleys 41 which are loose on the bar or shaft 39 whereas the pulleys 43 are fixed to the shaft 44, the construction being such that when the shaft 44 is rotated the ropes will wind thereon, leaving the bar 39 and the plunger parts mounted on it.

The left hand end portion of the shaft 44 projects outward considerably beyond the associate pulley 43 and receives a cross bar or hand piece 45 by which the shaft 44 may be conveniently rotated to wind the straps or ropes 42 on the pulleys 43 and thereby elevate the plunger devices 36—39. In order to retain the plunger devices in elevated positions pawl and ratchet devices may be employed comprising a ratchet wheel 46 secured to the shaft 44 inside the left hand pulley and cooperating with a pawl or detent 47 having a fixed pivot 47a and provided with a draw-spring 47b which maintains the pawl tooth in engagement with the ratchet.

It will be noted that when the shaft 44 is rotated the forcing means or plunger devices will move upward, the slots 40 cooperating with the ends of the shaft bar 39 to guide the plunger system, the length of the slots being sufficient to permit the upward movement to continue to the necessary extent. The plunger system is shown partially elevated in Fig. 3, from which it will be apparent that the plunger heads 37 serve in effect as bottom supports for the material in the hopper and upper part of the charging box. When the operator releases the hand piece 45 the pawl and ratchet devices will retain the plunger system in the position to which it has been elevated and in order to allow the plungers to return to their bottom or normal position it will be necessary to withdraw the pawl 47 from the ratchet wheel 46.

Means are preferably provided for moving to and fro or vibrating the coloring unit or apparatus in a direction transverse of the article to be colored or, in the present instance, the slurry film, the latter moving at right angles to the direction of vibration of the coloring apparatus. For this purpose the apparatus is provided with a set of rollers of wheels 48, two pairs of such rollers being shown in the present instance rotatively mounted on the cross bars 10d of the frame 10 near opposite ends thereof. These rollers may be flanged, as shown at their inner faces, so as to prevent side-wise displacement of the color unit from the fixed track-ways 49 (Fig. 1) on which the rollers run, these track-ways providing a support for the entire unit. Vibratory movement of the unit on the track-ways may be effected by means comprising a wheel or eccentric 50 rotatable at will by suitable power devices (not shown) and pivotally connected by a forked strap 51 with a bracket 52 fixed to and projecting outward from the right hand end of the apparatus frame.

In order to prepare the apparatus for use, the charging box 18 is removed from the apparatus, its slide 22 being in position to serve as a bottom or closure, and the compartments are filled with suitable dry coloring material in powdered form. There are four of such compartments shown and the materials in each may be of a different color or not as may be desired. It is to be understood that the term "color" is used generically as indicating a characteristic, and that the characteristics of the powdered material in the different compartments may vary in respects other than color. For descriptive purposes it may be assumed that the first or left hand compartment A of the charging box contains red coloring material, the second compartment B contains black coloring material, the third compartment C contains red coloring material and the fourth compartment D contains black coloring material, in which case a variegated coloring effect involving red and black will be applied to the article to be colored.

Prior to insertion of the charging box in the apparatus between the hopper and the piston housing or chamber, it will be understood that the pistons are all retracted to their lowermost or normal position and that the bottom closure of the slide 33 of the hopper 11 is in place. The parts being positioned and related as described, the charging box is slid into place through the grooves or guide-ways 28. At this time it will be understood that the slides 22 and 33 separate the apparatus into three sections, closing off the hopper and the piston housing from the charging box.

The slides may now be removed, thus interconnecting the hopper, charging box and piston housing so that if now the piston elements be elevated as heretofore described the coloring material will be forced upward by them from the charging box into the hopper in position to be acted on by the impeller which turns in the direction of the arrow, Fig. 3. This operates as described to expel the colored powders with considerable force through the hopper mouth and against the receiving surface, in the present case the belt, excess material dropping back into the hopper at the opposite side of the baffle plate as has been explained. It will be understood that the amount of material in the hopper may be suitably regulated by controlling the elevations of the piston devices which, in effect, serve as movable bottoms for the material holders.

When, towards the end of the charging operation, the plungers are fully elevated, all of the coloring material will be contained within the hopper. At this time the hopper bottom or slide plate 33 may be inserted in place so as to retain all the material in the hopper, permitting the plunger devices to be dropped down to normal position below the field of the charging box. To effect withdrawal of the plungers it is only necessary to disconnect the pawl and ratchet devices 46, 47 permitting the plungers to drop down by gravity. Thereupon the charging box may be withdrawn and recharged with coloring materials as has been described. The amount of coloring materials left in the hopper is sufficient to supply the apparatus during the time required for the recharging operation so that it is not necessary to stop the coloring process for recharging purposes.

I claim:

1. In an apparatus for applying dry coloring material to slurry films and the like including a belt receiving the film, the combination of a hopper, a container for coloring material supplied to the hopper, said container being independent of the hopper, means for positively forcing the coloring material at will from the container upward into the hopper, and throwing means on the hopper for throwing the material upward against the film belt.

2. In an apparatus for applying dry coloring material to slurry films and the like, the combination of a hopper, a removable and replaceable container for coloring material, means for forcing the material from the container into the hopper, a removable separator between the container and the hopper, and another removable separator between the container and the forcing means.

3. In an apparatus of the class described, the combination of a hopper, means for supplying the hopper with dry coloring material at will, and means within the hopper operating automatically to throw the coloring material against a slurry belt moving above the mouth of the hopper, the hopper being provided with baffle means at its mouth portion.

4. In an apparatus of the class described, the combination of a hopper, mechanical means for supplying the hopper with a mass of dry coloring material at will, and a single automatically actuated rotating means within the hopper operating directly on the mass of coloring material to expel it forcibly from the hopper, said means comprising a rotary element acting irregularly at preselected points in its length on the coloring material.

5. In an apparatus of the class described, the combination of a trough open for substantially its full length, a plurality of compartments containing coloring materials of different characteristics in dry form for supplying the trough, and an impeller comprising a plurality of differential devices for expelling the coloring materials from the trough and distributing them in irregular clouds against the surface against which they are impelled.

6. In an apparatus of the class described, the combination of a hopper containing powdered coloring materials of different characteristics, an impeller within the hopper and comprising a plurality of differential devices, and means for actuating the impeller to expel the coloring materials from the hopper in varying quantities at different points in the length of the impeller during a single complete action thereof so that the powdered material will be variably distributed in irregular clouds.

7. In an apparatus of the class described, the combination of a trough containing powdered coloring materials and having an open mouth at its top extending for substantially its full length, mechanical means for supplying the trough at the side opposite from its mouth with said material, and an impeller comprising a rotary shaft disposed within the trough below and parallel with its mouth and variously shaped paddles secured to the shaft at different longitudinal positions to throw out the powdered materials in irregular clouds.

8. An apparatus for applying dry coloring materials to slurry films and the like comprising, in combination, a hopper, a removable and replaceable container for coloring materials, a removable separator between the container and the hopper, means for forcing the materials from the container into the hopper, and another removable separator between the container and the forcing means, said apparatus being shiftable endwise at right angles to the movement of the slurry film to effect variable distribution of the coloring materials.

9. An apparatus according to claim 2, characterized by a hopper disposed at the top of the apparatus, an endwise removable charging box arranged below the hopper, and a piston disposed below the charging box.

10. An apparatus of the class described, comprising a hopper, a piston chamber, a charging box disposed between the hopper and the piston chamber and provided with partitions spaced to provide separate compartments, and pistons in said chamber and movable one into each compartment of the charging box.

11. An apparatus of the class described, comprising a hopper, a piston chamber, a removable charging box disposed between the hopper and the piston chamber, removable separators one between the hopper and the charging box and the other between the charging box and the piston chamber, and a piston apparatus in said chamber for forcing material from the charging box into the hopper.

12. An apparatus of the class described, comprising a hopper, a piston chamber, a charging box disposed between the hopper and the piston chamber and divided into receptacles for powdered coloring materials, removable separators one between the hopper and the charging box and the other between the charging box and the piston chamber, a plurality of pistons in said chamber, one for each receptacle in the charging box, and means for at will moving said pistons to cooperate with the coloring materials in said receptacles.

13. In an apparatus for applying dry coloring materials to moving surfaces, the combination of a hopper having its mouth portion below the moving surface, a piston chamber, a charging box disposed between the hopper and the piston chamber and provided with separate receptacles for colored powders, removable separators one between the hopper and the charging box and another between the charging box and the piston chamber whereby the charging box may be shut off from both at will, a plurality of pistons in said chamber, one for each receptacle, means for at will moving said pistons to force the colored powders from said receptacles into the hopper, and impelling means within the hopper for expelling the colored powders against the moving surface above the hopper mouth.

14. An apparatus of the class described, comprising a hopper, material forcing means, a charging box disposed between said hopper and said forcing means, means for moving the forcing means through the charging box to force material into the hopper, and means for maintaining the forcing means in adjusted positions to control the amount of material in the hopper.

15. An apparatus according to claim 2, further characterized by a material container and a plurality of bottom elements for said container, said bottom elements being interchangeably employed, one of said bottom elements having when in use an unvarying relationship to the container and the other being adjustable to different positions to vary the holding capacity of the container.

CHARLES P. HAFF.